US005799964A

United States Patent [19]

Chao

[11] Patent Number: 5,799,964

[45] Date of Patent: Sep. 1, 1998

[54] WHEELCHAIR ARMREST ASSEMBLY

[76] Inventor: Ya-chen Chao, No. 11-2, Tatung Rd., Wufeng Hsiang, Taichung Hsien, Taiwan

[21] Appl. No.: 627,348

[22] Filed: Apr. 3, 1996

[51] Int. Cl.[6] .............................. B60R 9/00; A47C 7/68; A47B 83/02

[52] U.S. Cl. ...................... 280/304.1; 297/145; 297/155; 297/DIG. 4

[58] Field of Search ....... 280/304.1; 297/411.3–411.34, 297/411.45, 145, DIG. 4, 188.14–188.19, 147, 150–155, 411.2, 411.35–411.38, 188.2, 162, 194; 108/44, 50; 224/281, 282; 248/289.11

[56] References Cited

U.S. PATENT DOCUMENTS

| | | | |
|---|---|---|---|
| 2,947,348 | 8/1960 | Peckham . | |
| 3,547,488 | 12/1970 | Barnes | 297/162 |
| 3,583,760 | 6/1971 | McGregor | 297/145 |
| 3,632,161 | 1/1972 | Arfaras et al. | 297/145 |
| 3,759,569 | 9/1973 | Bennet | 280/304.1 |
| 4,428,616 | 1/1984 | Hamilton | 297/145 |
| 4,572,577 | 2/1986 | LaRue | 297/DIG. 4 |
| 4,730,869 | 3/1988 | Schumacher | 280/304.1 |
| 4,779,884 | 10/1988 | Minati | 280/304.1 |
| 5,026,114 | 6/1991 | Miller | 297/188.15 |
| 5,139,309 | 8/1992 | Kornreich | 297/145 |
| 5,299,824 | 4/1994 | Roberts . | |
| 5,588,663 | 12/1996 | Rundle et al. | 280/304.1 |

FOREIGN PATENT DOCUMENTS

| | | |
|---|---|---|
| 2 391 680 | 12/1978 | France . |
| 39 41 264 A1 | 6/1991 | Germany . |
| WO 81/01096 | 4/1981 | WIPO . |
| WO 94/16660 | 8/1994 | WIPO . |

*Primary Examiner*—Douglas C. Butler
*Attorney, Agent, or Firm*—Townsend and Townsend and Crew LLP

[57] ABSTRACT

An armrest assembly for a wheelchair which includes a seat, two support braces, two front legs, and two rear legs. The armrest assembly includes at least one box placed on an associated support brace. At least one fastener is secured to a front end of an associated support brace. At least one first tube has an upper end fixedly mounted on a front end portion of the box and a lower end detachably engaged with the fastener. At least one second tube has an upper end fixedly mounted to a rear end portion of the box and a lower end pivotally engaged with an associated rear leg. At least one pivot base is secured to the front end portion of the box. At least one pivot block is pivotally mounted on the pivot base. At least one pivot arm is pivotally engaged with an extension of the pivot block and is releasably mounted in a chamber of the box. At least one holding table is fixedly mounted on the pivot arm and is releasably received in the chamber.

8 Claims, 10 Drawing Sheets

WHEELCHAIR ARMREST ASSEMBLY

FIELD OF THE INVENTION

The present invention relates to an armrest assembly, and more particularly to an armrest assembly suitable for a wheelchair.

BACKGROUND OF THE INVENTION

A conventional wheelchair structure is shown in FIG. 10. However, there still remain shortcomings therein.

There will be a complete illustration in the detailed description of the preferred embodiments, concerning the conventional wheelchair.

The present invention has arisen to mitigate and/or obviate the disadvantage of the conventional wheelchair.

SUMMARY OF THE INVENTION

In accordance with one aspect of the present invention, there is provided an armrest assembly for a wheelchair which comprises a seat with two sides each having a first end and a second end, two support braces each horizontally mounted on an associated side of the seat and each having a first end and a second end, two first legs each vertically mounted on the first end of an associated side of the seat and located adjacent to the first end of an associated support brace, and two second legs each vertically mounted on the second end of an associated side of the seat and located adjacent to the second end of an associated support brace.

The armrest assembly comprises at least one box placed on an associated support brace and having a first end portion and a second end portion. A chamber is defined in the box between the first and second end portions thereof.

At least one fastener is secured to the first end of an associated support brace. At least one first tube has an upper end fixedly mounted on the first end portion of the box and a lower end detachably engaged with the fastener. At least one second tube has an upper end fixedly mounted to the second end portion of the box and a lower end pivotally engaged with an associated second leg.

At least one pivot base is secured to the first end portion of the box. At least one pivot block is pivotally mounted on the pivot base. An extension extends from the pivot block to pivot therewith. At least one pivot arm is pivotally engaged with the extension and is releasably mounted in the chamber of the box. At least one holding table is fixedly mounted on the pivot arm and is releasably received in the chamber of the box.

Further features of the present invention will become apparent from a careful reading of the detailed description with appropriate reference to the accompanying drawings.

DETAILED DESCRIPTION OF THE PREFERRED EMBODIMENTS

Figure 10:
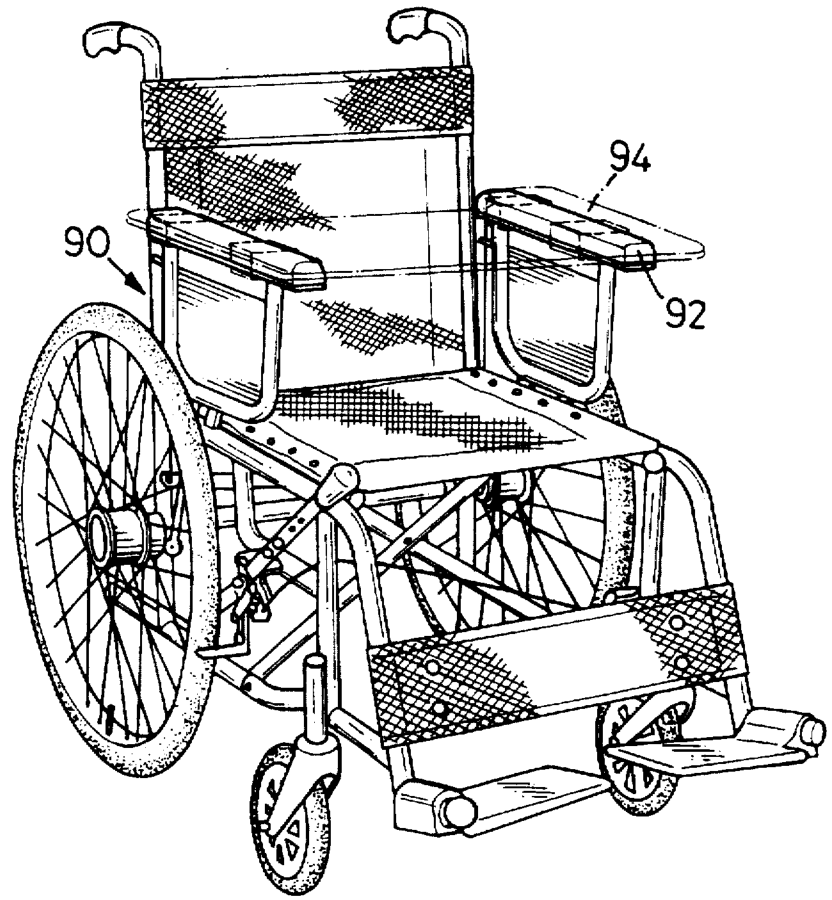
FIG. 10 PRIOR ART
FIG. 10 is a perspective view of a wheelchair according to the prior art.

For a better understanding of features and benefits of the present invention, a reference is made to FIG. 10, illustrating a conventional wheelchair in accordance with the prior art. The conventional wheelchair 90 comprises an armrest 92 and a holding table 94 detachably supported on the armrest 92 such that a user can employ the holding table 94 for reading, eating, etc. However, the holding table 94 occupies a large space and is not easily portable. In addition, it is necessary for the user to assemble when in use and dismantle when not in use the holding table 94 repeatedly, thereby greatly causing an inconvenience to the user.

Figure 1:
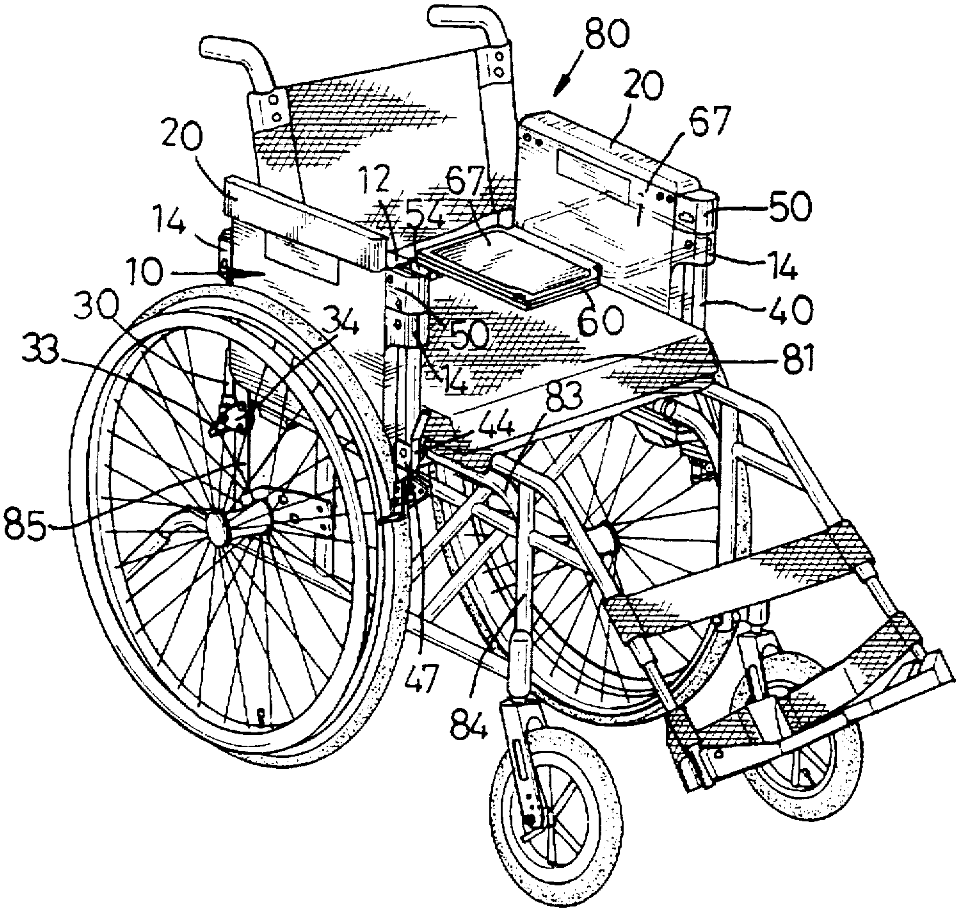
FIG. 1 is a perspective view of a wheelchair armrest assembly in accordance with the present invention.
Figure 2:
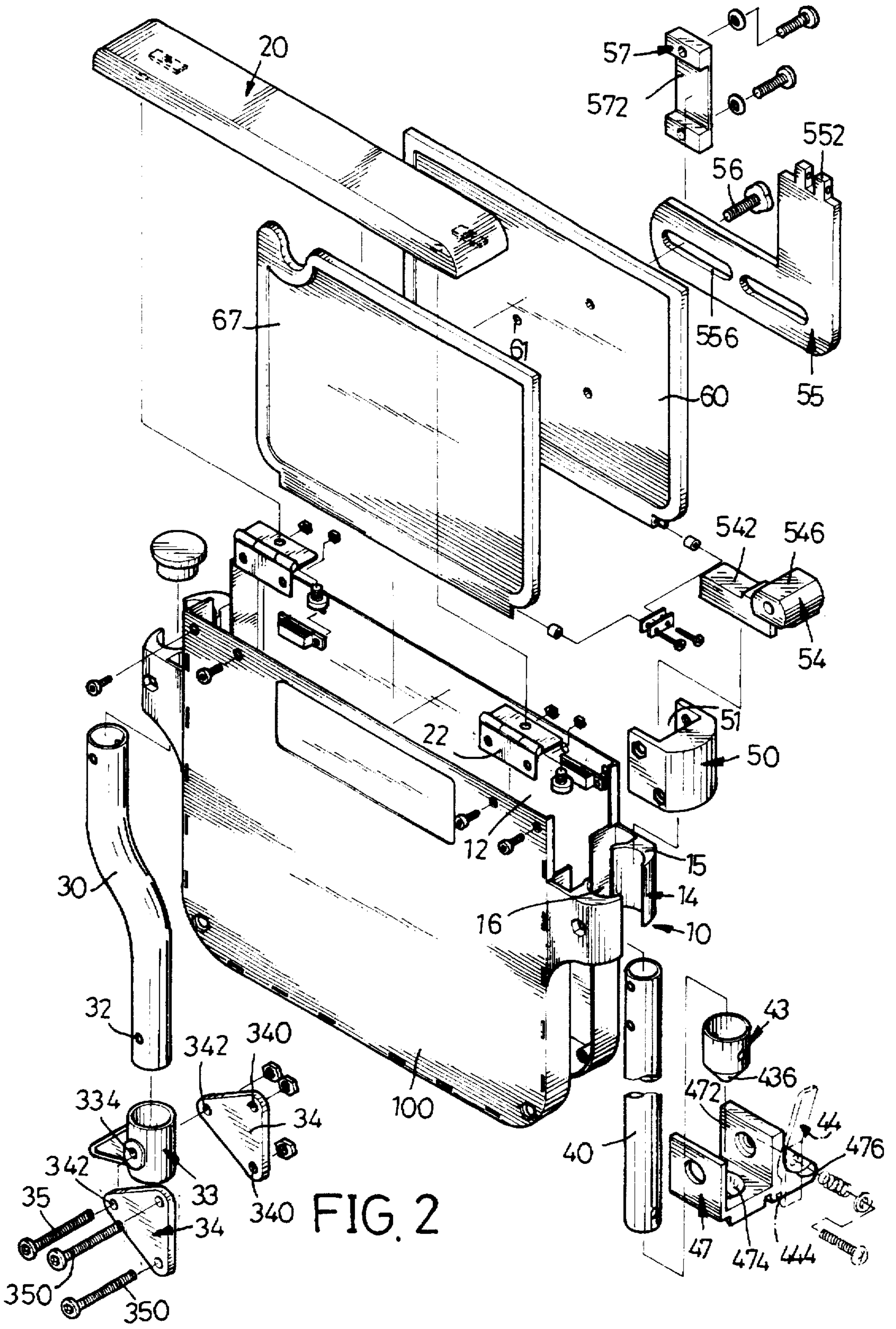
FIG. 2 is an exploded view of the armrest assembly.
Figure 3:
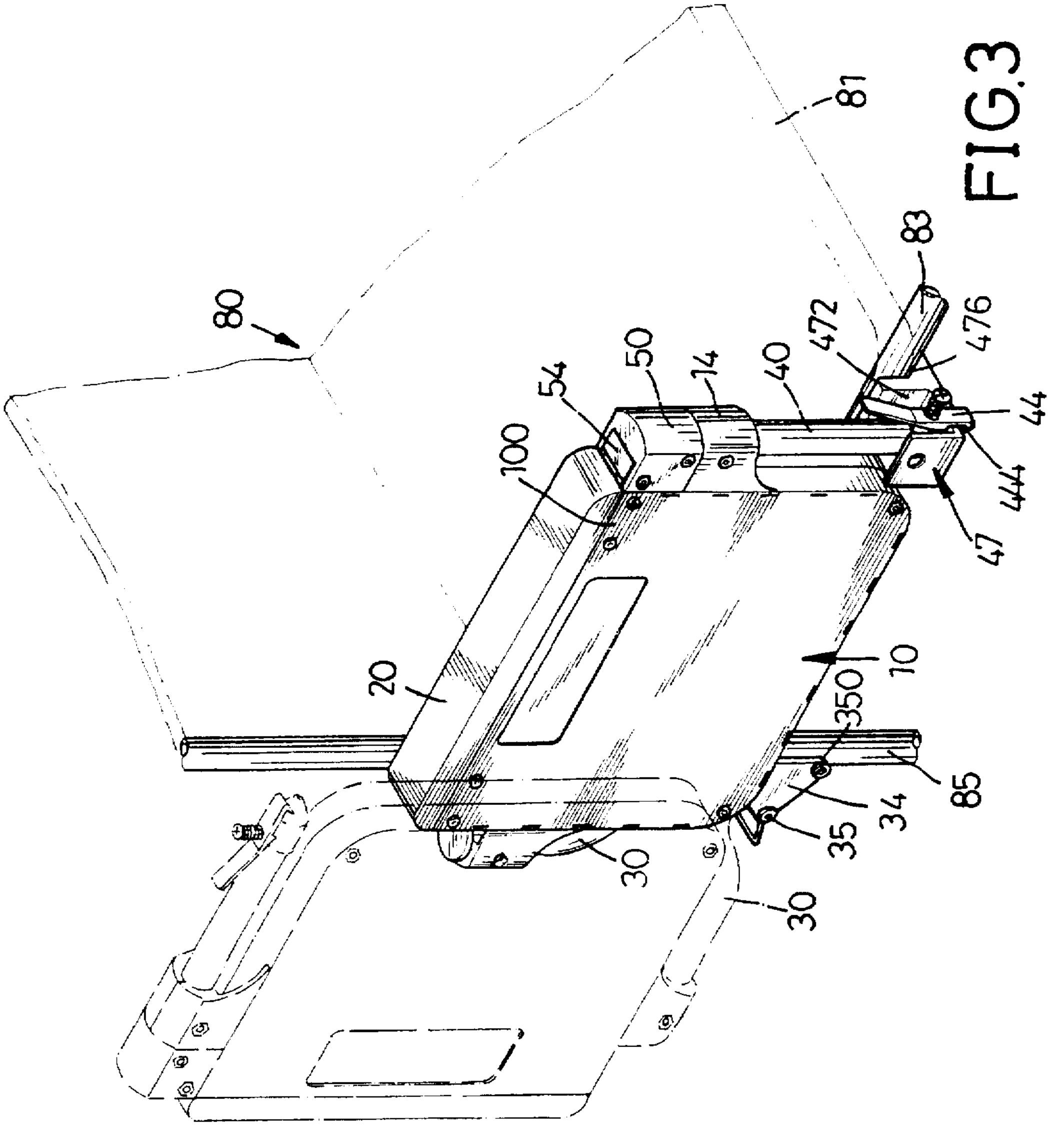
FIG. 3 is an assembly view of FIG. 2.

Referring to the remaining drawings, and initially to FIGS. 1–3, an armrest assembly in accordance with the present invention is provided for a wheelchair 80 which comprises a seat 81 with two sides each having a first (or front) end and a second (or rear) end, two support braces 83 each horizontally mounted on an associated side of the seat 81 and each having a first (or front) end and a second (or rear) end, two first (or front) legs 84 each vertically mounted on the first end of an associated side of the seat 81 and located adjacent to the first end of an associated support brace 83, and two second (or rear) legs 85 each vertically mounted on the second end of an associated side of the seat 81 and located adjacent to the second end of an associated support brace 83.

The armrest assembly comprises at least one box 10 placed on an associated support brace 83 and having a first (or front) end portion and a second (or rear) end portion. A chamber 12 is defined in the box 10 between the first and second end portions thereof.

At least one fastener 47 is secured to the first end of an associated support brace 83. At least one first (or front) tube 40 has an upper end fixedly mounted on the first end portion of the box 10 and a lower end detachably engaged with the fastener 47. At least one second (or rear) tube 30 has an upper end fixedly mounted to the second end portion of the box 10 and a lower end pivotally engaged with an associated second leg 85.

At least one pivot base 50 is secured to the first end portion of the box 10. At least one pivot block 54 is pivotally mounted on the pivot base 50. An extension 542 extends from the pivot block 54 to pivot therewith. At least one pivot arm 55 is pivotally engaged with the extension 542 and is releasably mounted in the chamber 12 of the box 10.

At least one holding table 60 is fixedly mounted on the pivot arm 55 and is releasably received in the chamber 12 of the box 10. An assistant table 67 is pivotally engaged with the holding table 60 and is received in the chamber 12 of the box 10.

Preferably, the box 10 includes two half bodies 100 fixedly coupled with each other. Each of the two half bodies 100 has a semi-cylindrical flange 15 laterally formed on first and second ends thereof and combined with each other so as to form a positioning base 14 with a passage 16 vertically defined therethrough. A cover 20 is pivotally mounted on an upperside of one of the two half bodies 100 by means of two hinge members 22 for closing the chamber 12.

The upper end of the first tube 40 extends through the passage 16 and is fixedly mounted in the positioning base 14 at the first end portion of the box 10 with part of the upper end of the first tube 40 extending outward of the positioning base 14 and fixedly engaged in the pivot base 50 which is secured on the positioning base 14.

The fastener 47 includes a U-shaped bracket 472 with a tapered socket 474 defined in a horizontal section thereof, and an arcuate engaging extension 476 fixedly engaged with the first end of the associated support brace 83. An end cap 43 is fixedly mounted on the lower end of the first tube 40 and includes a tapered lower end 436 releasably received in the tapered socket 474.

A snapping member 44 is pivotally mounted on the end cap 43 and has a hook portion 444 formed on a lower end thereof and detachably rested on an underside of the horizontal section of the U-shaped bracket 472.

The upper end of the second tube 30 extends through the passage 16 and is fixedly mounted in the positioning base 14 at the second end portion of the box 10.

Especially referring to FIGS. 2 and 3, two retaining strips 34 are each fixedly mounted on a lower end of an associated second leg 85. Preferably, two positioning bolts 350 each extend through an associated bore 340 transversely defined in each of the two retaining strips 34 and through the lower end of the associated second leg 85 such that each of the two retaining strips 34 is securely mounted on the lower end of the second leg 85 as shown in FIG. 3.

A pivot axle 33 is fixedly mounted on the lower end of the second tube 30 and is pivotally mounted between the two retaining strips 34. Preferably, a retaining bolt 35 extends through a hole 342 transversely defined in each of the two retaining strips 34, a socket 334 transversely defined in the pivot axle 33, and a bore 32 transversely defined in the lower end of the second tube 30 such that the second tube 30 together with the pivot axle 33 can be pivoted relative to the associated second leg 85 via the two retaining strips 34 as shown in FIG. 3 when the hook portion 444 of the snapping member is detached from the bracket 47.

Figure 5:
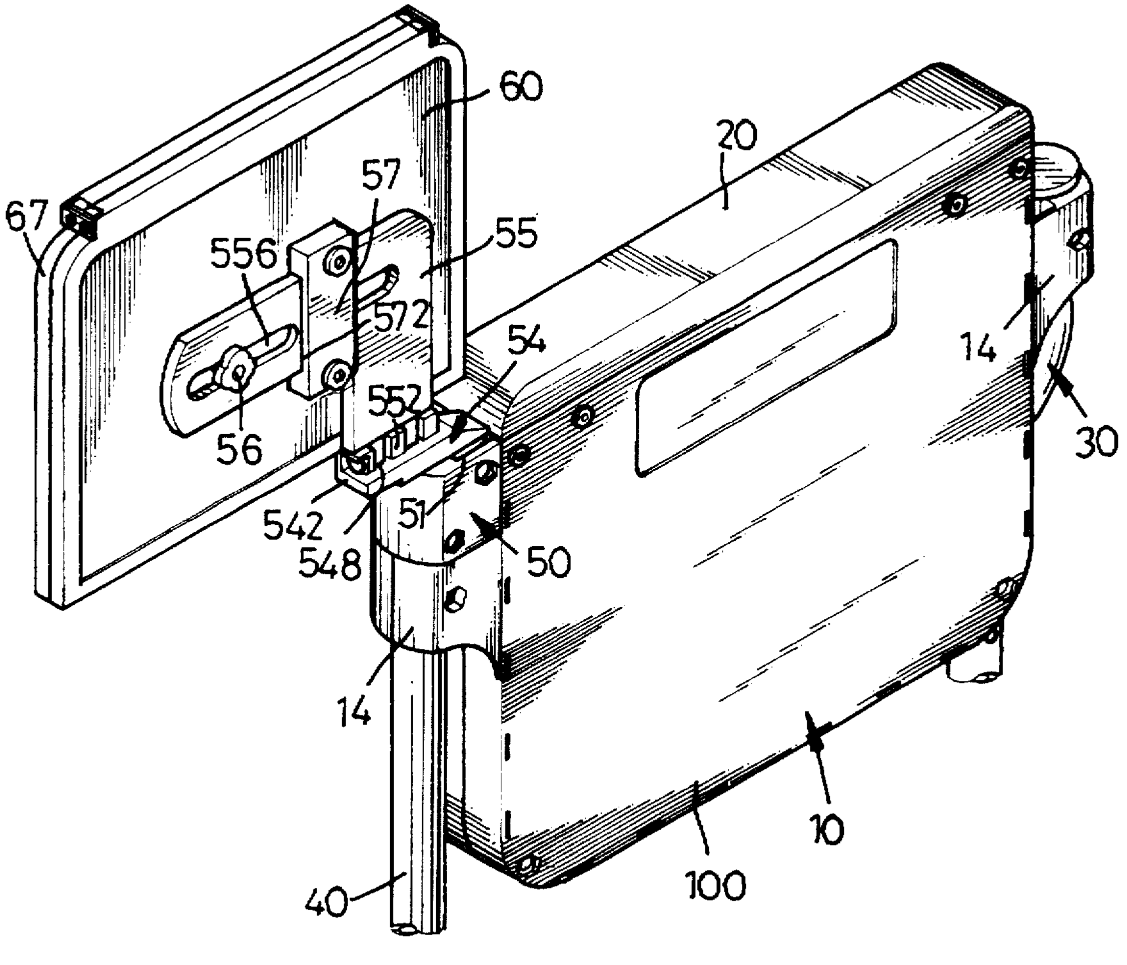
FIG. 5 is a further operational view of FIG. 4.

Referring to FIGS. 2 and 5, the pivot block 54 is pivotally received in a recess 51 defined in the pivot base 50 and has a flat surface 546 formed on an upperside thereof. The pivot arm 55 is an L-shaped plate with a short section pivotally engaged with the extension 542 and has a long section with an elongated slot 556 transversely defined therein.

Preferably, a plurality of ears 552 are formed on the short section of the pivot arm 55 and are fitted into a plurality of cavities 548 defined in an underside of the extension 542 such that the short section of the pivot arm 55 is pivotally engaged with the extension 542 of the pivot block as shown in FIG. 5.

An urging member 56 extends through the elongated slot 556 and is engaged in a hole 61 threadedly defined in the holding table 60. A guiding member 57 is fixedly mounted on the holding table 60 and has a guiding channel 572 defined therein for slidably receiving the long section of the pivot arm 55 therein.

Figure 4:
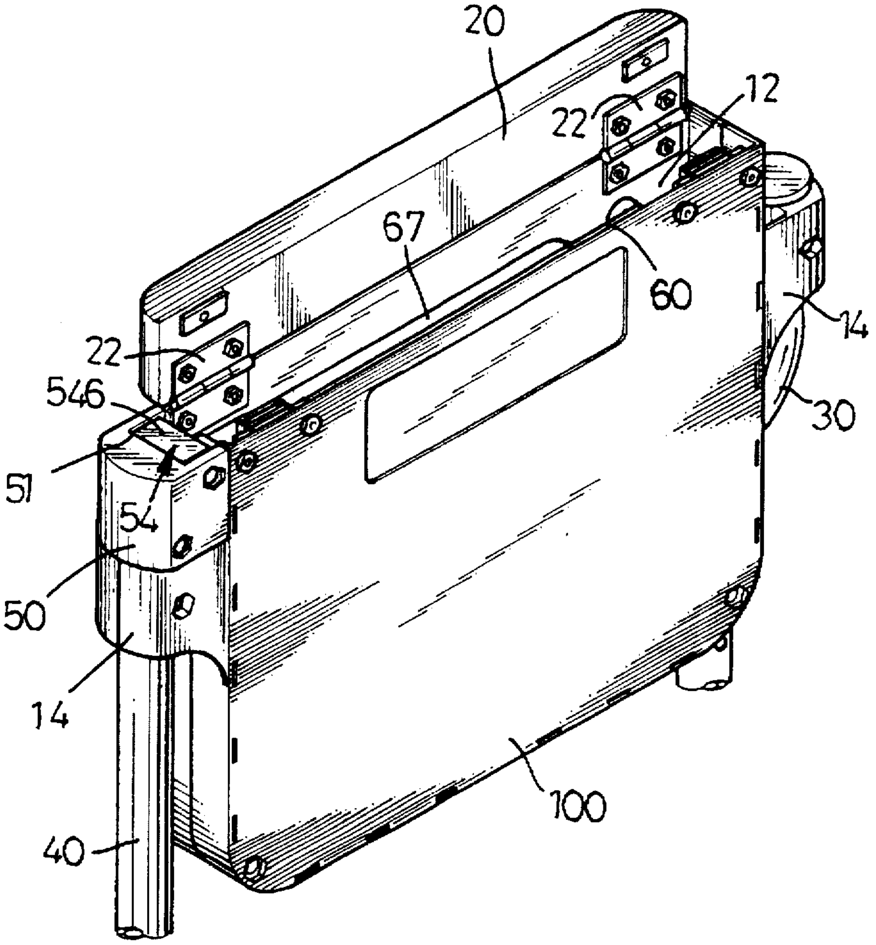
FIG. 4 is an operational view of FIG. 3.
Figure 6:
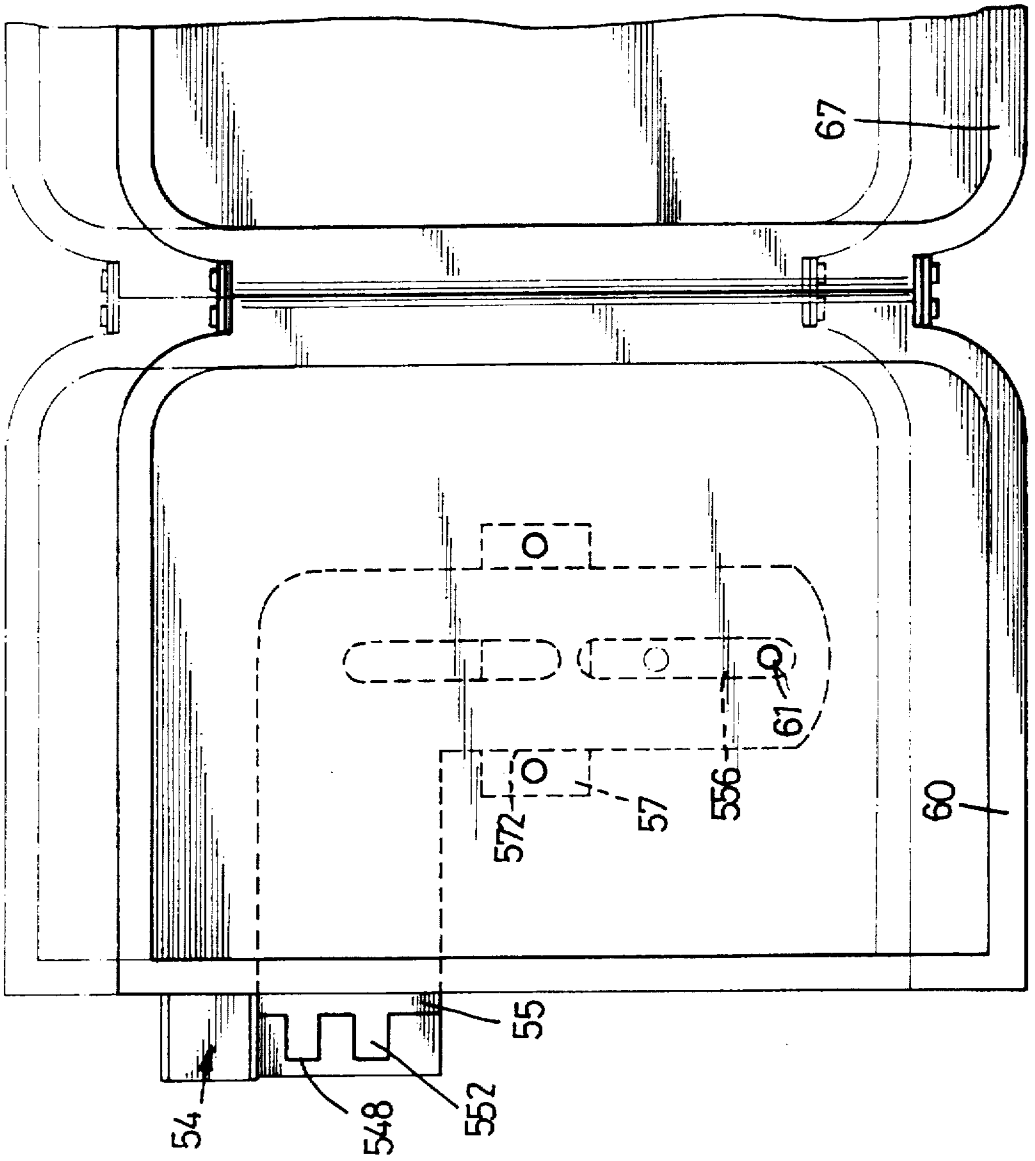
FIG. 6 is a top plan partially enlarged expanded view of FIG. 5.

In operation, referring to FIGS. 4–6 with reference to FIGS. 1 and 2, the cover 20 can be pivoted relative to one half body 100 via the hinge members 22 as shown in FIG. 4 such that the pivot arm 55 together with the pivot block 54 can be pivoted outwardly relative to the pivot base 50 so as to move out the holding table 60 together with the assistant table 67 as shown in FIG. 5.

Then, the pivot arm 55 can be pivoted relative to the extension 542 of the pivot block 54, thereby placing the holding table 60 together with the assistant table 67 in a horizontal manner as shown in FIGS. 1 and 6. The assistant table 67 can be pivoted relative to the holding table 60, thereby further expanding the assistant table 67 as shown in phantom lines in FIG. 1 such that the expanded tables 60 and 67 can be used by a user.

Figure 7:
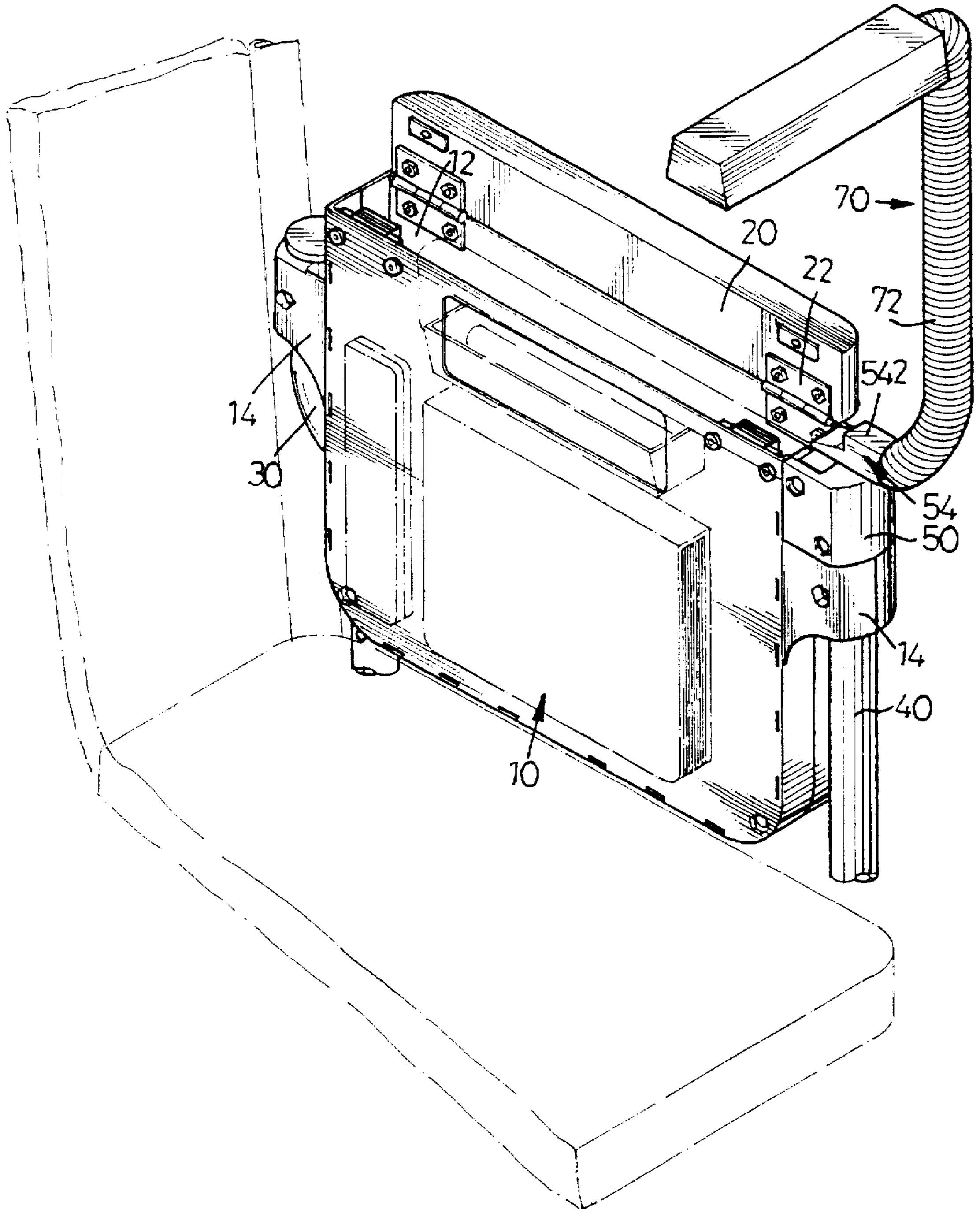
FIG. 7 is a perspective view of an armrest assembly in accordance with another embodiment of the present invention.

Referring to FIG. 7, according to another embodiment of the present invention, the pivot arm 55 is undefined and a lamp 70 has a flexible hose 72 connected to the extension 542 of the pivot block 54 to pivot therewith such that the lamp 70 can be used by a user when needed.

Figure 8:
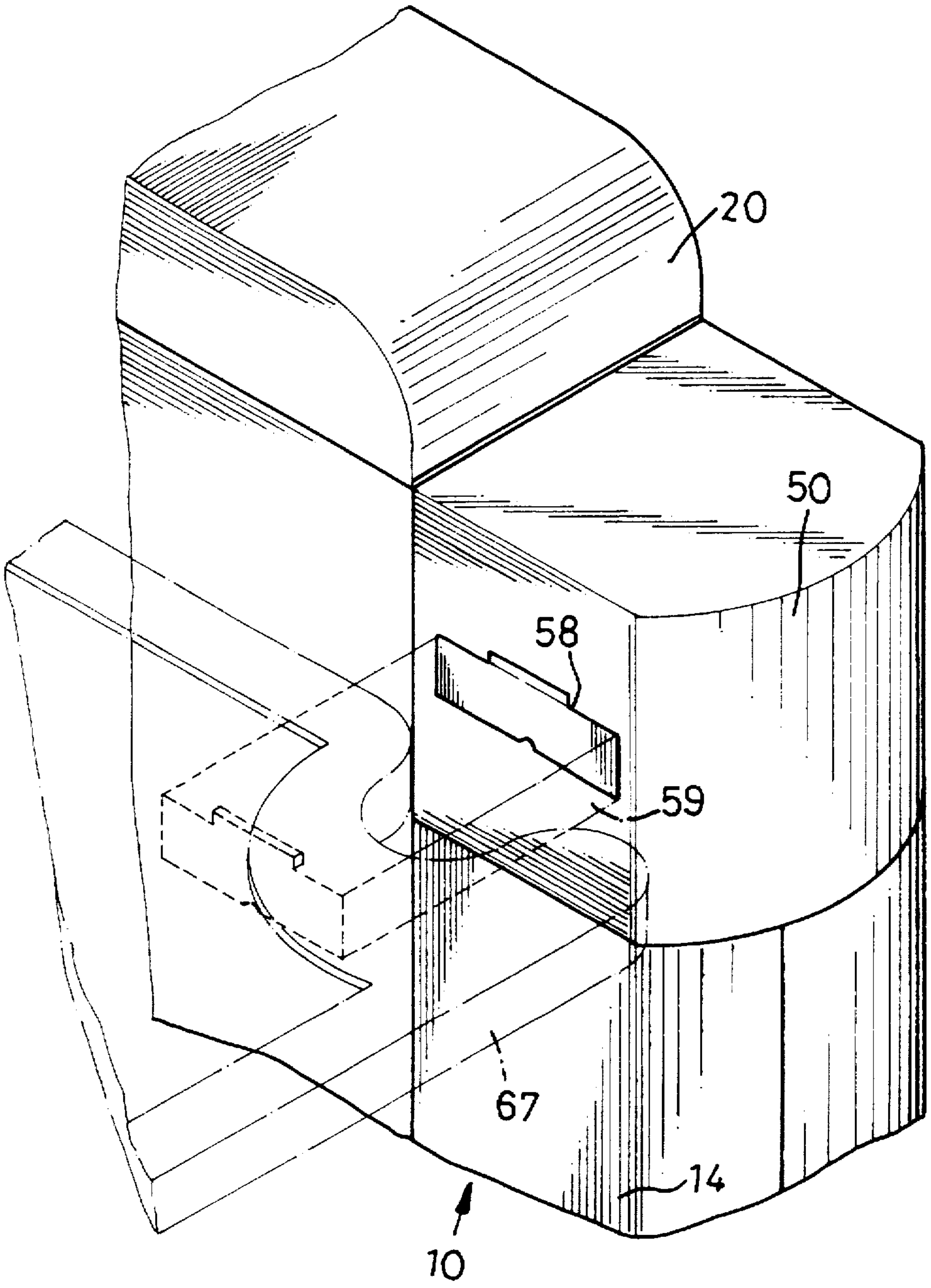
FIG. 8 is a partially cut-away perspective view of an armrest assembly according to a further embodiment of the present invention.

Referring to FIG. 8 with reference to FIG. 1, according to a further embodiment of the present invention, the pivot base 50 on one side of the seat 81 includes a guiding groove 58 transversely defined therein. A sliding block 59 is slidably mounted in the guiding groove 58 and can be expanded outwardly as shown in phantom lines so as able to support the assistant table 67 moved from the other side of the seat 81.

Figure 9:
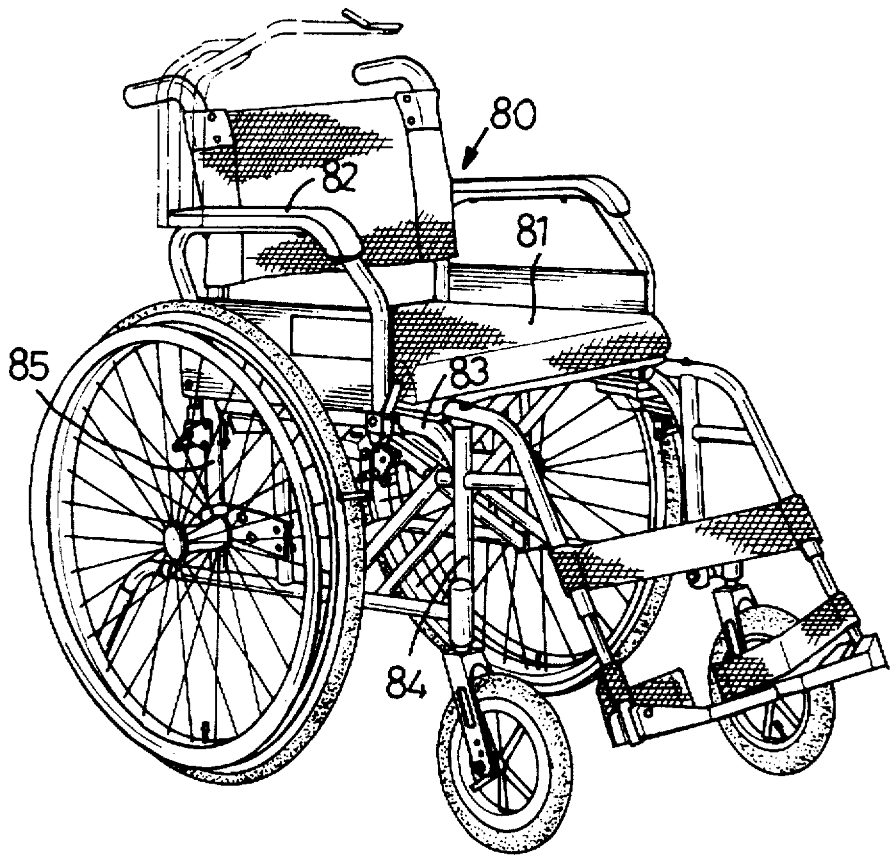
FIG. 9 is a perspective view of a wheelchair according to a further embodiment of the present invention.

Referring to FIG. 9 with reference to FIGS. 1 and 3, according to a further embodiment of the present invention, the hook portion 444 can be detached from the bracket 47 and the two retaining strips 34 can be disengaged from the lower end of the rear leg 85 such that the whole armrest assembly comprising the box 10 can be removed from the wheelchair 80 easily and two simple armrests 82 of a conventional type can be mounted on the seat 81 for ordinary use.

It should be clear to those skilled in the art that further embodiments of the present invention may be made without departing from disclosures of the present invention.

What is claimed is:

1. An armrest assembly for a wheelchair (80) which comprises a seat (81) with two sides each having a first end and a second end, two support braces (83) each horizontally mounted on an associated side of said seat (81) and each having a first end and a second end, two first legs (84) each vertically mounted on the first end of an associated side of said seat (81) and located adjacent to the first end of an associated said support brace (83), and two second legs (85) each vertically mounted on the second end of an associated side of said seat (81) and located adjacent to the second end of an associated said support brace (83), said armrest assembly comprising:

at least one box (10) placed on an associated said support brace (83) and having a first end portion and a second end portion, a chamber (12) defined in said box (10) between said first and second end portions thereof;

at least one fastener (47) secured to the first end of an associated said support brace (83);

at least one first tube (40) having an upper end fixedly mounted on the first end portion of said box (10) and a lower end detachably engaged with said fastener (47);

at least one second tube (30) having an upper end fixedly mounted to the second end portion of said box (10) and a lower end pivotally engaged with an associated said second leg (85);

at least one pivot base (50) secured to the first end portion of said box (10);

at least one pivot block (54) pivotally mounted on said pivot base (50), an extension (542) extending from said pivot block (54) to pivot therewith;

at least one pivot arm (55) pivotally engaged with said extension (542) and releasably mounted in said chamber (12) of said box (10); and at least one holding table (60) fixedly mounted on said pivot arm (55) and releasably received in said chamber (12) of said box (10).

2. The armrest assembly in accordance with claim 1, wherein said fastener (47) includes a U-shaped bracket (472) with a tapered socket (474) defined in a horizontal section thereof, an end cap (43) fixedly mounted on the lower end of said first tube (40) and including a tapered lower end (436) releasably received in said tapered socket (474).

3. The armrest assembly in accordance with claim 2, further comprising a snapping member (44) pivotally mounted on said end cap (43) and having a hook portion (444) formed on a lower end thereof and detachably rested on an underside of the horizontal section of said U-shaped bracket (472).

4. The armrest assembly in accordance with claim 1, further comprising two retaining strips (34) each fixedly mounted on a lower end of said second leg (85), a pivot axle (33) fixedly mounted on the lower end of said second tube (30) and pivotally mounted between said two retaining strips (34).

5. The armrest assembly in accordance with claim 1, wherein said box (10) includes two half bodies (100) fixedly coupled with each other, and a cover (20) pivotally mounted on an upperside of one of said two half bodies (100).

6. The armrest assembly in accordance with claim 1, further comprising an assistant table (67) pivotally engaged with said holding table (60) and received in said chamber (12) of said box (10).

7. The armrest assembly in accordance with claim 1, wherein said pivot arm (55) has an elongated slot (556) transversely defined therein, a hole (61) threadedly defined in said holding table (60), and an urging member (56) extending through said elongated slot (556) and threadedly engaged in said hole (61).

8. The armrest assembly in accordance with claim 7, further comprising a guiding member (57) fixedly mounted on said holding table (60) and having guiding channel (572) defined therein for slidably receiving said pivot arm (55) therein.

* * * * *